(12) United States Patent
Nakagawa et al.

(10) Patent No.: US 7,973,502 B2
(45) Date of Patent: Jul. 5, 2011

(54) DRIVE UNIT AND MANUFACTURING METHOD THEREOF

(75) Inventors: Yoshinari Nakagawa, Hazu (JP); Tomoo Atarashi, Kariya (JP); Takafumi Koshida, Anjo (JP)

(73) Assignee: Aisin Aw Co., Ltd., Anjo (JP)

( * ) Notice: Subject to any disclaimer, the term of this patent is extended or adjusted under 35 U.S.C. 154(b) by 411 days.

(21) Appl. No.: 12/318,498

(22) Filed: Dec. 30, 2008

(65) Prior Publication Data
US 2009/0237018 A1 Sep. 24, 2009

(30) Foreign Application Priority Data
Mar. 21, 2008 (JP) .................................. 2008-073803

(51) Int. Cl.
*H02P 6/00* (2006.01)

(52) U.S. Cl. .................. 318/400.16; 318/464; 318/465; 318/830; 318/831; 318/491; 318/400.39; 318/400.38; 318/606; 318/607; 318/608; 360/73.03; 310/191; 310/68 B

(58) Field of Classification Search ............ 318/400.16, 318/400.39, 400.38, 830, 491, 831, 538, 318/606–608, 459, 464, 465; 319/68 B, 319/191; 360/73.03
See application file for complete search history.

(56) References Cited

U.S. PATENT DOCUMENTS

| | | | | |
|---|---|---|---|---|
| 5,280,222 A | * | 1/1994 | von der Heide et al. | 318/400.04 |
| 5,397,972 A | * | 3/1995 | Maiocchi | 318/400.11 |
| 6,400,119 B1 | * | 6/2002 | Garza et al. | 318/798 |
| 6,646,433 B2 | * | 11/2003 | Milvich | 324/207.17 |
| 6,879,129 B2 | * | 4/2005 | Tazawa et al. | 318/727 |
| RE39,076 E | * | 4/2006 | von der Heide et al. | 318/400.4 |

FOREIGN PATENT DOCUMENTS

| | | |
|---|---|---|
| JP | A-61-010715 | 1/1986 |
| JP | A-2002-051580 | 2/2002 |
| JP | A-2005-295639 | 10/2005 |
| JP | A-2007-228700 | 9/2007 |

* cited by examiner

*Primary Examiner* — Rita Leykin
(74) *Attorney, Agent, or Firm* — Oliff & Berridge, PLC

(57) ABSTRACT

A drive unit includes a rotating electrical machine; a rotation sensor that detects a rotational position of a rotor of the rotating electrical machine, and a storage medium. In an inspecting step of measuring a counter electromotive force by mechanically driving the rotating electrical machine after the rotating electrical machine and the rotation sensor are assembled together, positional error information of the rotation sensor obtained based on information of the counter electromotive force and output information from the rotation sensor is stored in the storage medium. The storage medium is integrally provided to the drive unit in such a state that the storage medium is readable upon assembling a control device that controls the rotating electrical machine.

25 Claims, 3 Drawing Sheets

DRIVE UNIT AND MANUFACTURING METHOD THEREOF

CROSS-REFERENCE TO RELATED APPLICATION

The disclosure of Japanese Patent Application No. 2008-073803 filed on Mar. 21, 2008 including the specification, drawings and abstract is incorporated herein by reference in its entirety.

BACKGROUND

The present invention relates to a drive unit and a manufacturing method of the drive unit.

A drive unit including a rotating electrical machine (a motor and a generator) is provided with a rotation sensor for precisely detecting a rotational position of a rotor with respect to a stator in order to provide accurate speed control of the rotating electrical machine. The rotational position of the rotor is precisely detected by the rotation sensor in order to determine a current value and a current phase that are to be applied to the rotating electrical machine based on an output signal from the rotation sensor.

It is extremely rare that such a drive unit is assembled without any assembly error between the rotating electrical machine and the rotation sensor with a single assembling operation. Such an assembly error or the like causes a phase difference between the rotating electrical machine and the rotation sensor. The "phase difference between the rotating electrical machine and the rotation sensor" herein means the phase difference between a rotational phase of a specific part in a circumferential direction of the rotor of the rotating electrical machine and a rotational phase of a part of the rotation sensor corresponding to the specific part (the same applies to the description given below). In order to make these phases match each other, it is usually necessary to adjust this phase difference at least once.

Japanese Patent Application Publication No. JP-A-2005-295639 describes a method for adjusting the phase difference between the rotating electrical machine and the rotation sensor. After the rotating electrical machine and the rotation sensor are assembled together, a counter electromotive force is generated by rotating a rotating shaft of the rotating electrical machine, and a voltage waveform of the rotating electrical machine is compared with a detecting voltage waveform of the rotation sensor. When the phase difference between the voltage waveforms is out of a predetermined range, the rotation sensor is manually rotated in a circumferential direction with respect to the rotating electrical machine. In this method, the above operation is repeated until the phase difference falls within the predetermined range. Japanese Patent Application Publication No. JP-A-S61-10715 describes a method in which an error of the rotation sensor is measured in advance and stored in a memory portion of a control device for controlling the rotation sensor, and an accurate position is obtained based on the stored error information and a detected value obtained from the rotation sensor.

SUMMARY

When a drive unit is manufactured by the method described in Japanese Patent Application Publication No. JP-A-2005-295639 however, phase adjustment is performed manually, which requires a lot of time and labor. Moreover, an adjustment mechanism for performing phase adjustment needs to be mounted to the drive unit, causing an increase in cost. On the other hand, such problems do not occur when a drive unit is manufactured by the method described in Japanese Patent Application Publication No. JP-A-S61-10715. However, when the manufacture and assembly of drive units and control devices to vehicles is carried out in separate processes or separate factories or separate companies, special management work for making each drive unit correspond one-to-one to a control device storing error information of that drive unit is required for transportation, storage, and the like of the drive units and the control devices. This increases the cost.

The present invention is made in view of the above problems and it is an object of the present invention to provide a drive unit capable of adjusting the phase difference between a rotating electrical machine and a rotation sensor in a simple way and at a low cost, and a manufacturing method of the drive unit. The present invention can also achieve various other advantages.

According to an exemplary aspect of the invention, a drive unit includes a rotating electrical machine; a rotation sensor that detects a rotational position of a rotor of the rotating electrical machine, and a storage medium. In an inspecting step of measuring a counter electromotive force by mechanically driving the rotating electrical machine after the rotating electrical machine and the rotation sensor are assembled together, positional error information of the rotation sensor obtained based on information of the counter electromotive force and output information from the rotation sensor is stored in the storage medium. The storage medium is integrally provided to the drive unit in such a state that the storage medium is readable upon assembling a control device that controls the rotating electrical machine.

According to an exemplary aspect of the invention, a method for manufacturing a drive unit including a rotating electrical machine and a rotation sensor that detects a rotational position of a rotor of the rotating electrical machine, includes the steps of assembling the rotating electrical machine and the rotation sensor; measuring a counter electromotive force by mechanically driving the rotating electrical machine; obtaining positional error information of the rotation sensor based on information of the counter electromotive force and output information from the rotation sensor; storing the positional error information in a storage medium; and integrally arranging the storage medium to the drive unit in such a state that the storage medium is readable upon assembling a control device for controlling the rotating electrical machine.

BRIEF DESCRIPTION OF THE DRAWINGS

Various exemplary aspects of the invention will be described with reference to the drawings, wherein.

DETAILED DESCRIPTION OF EMBODIMENTS

Figure 1:
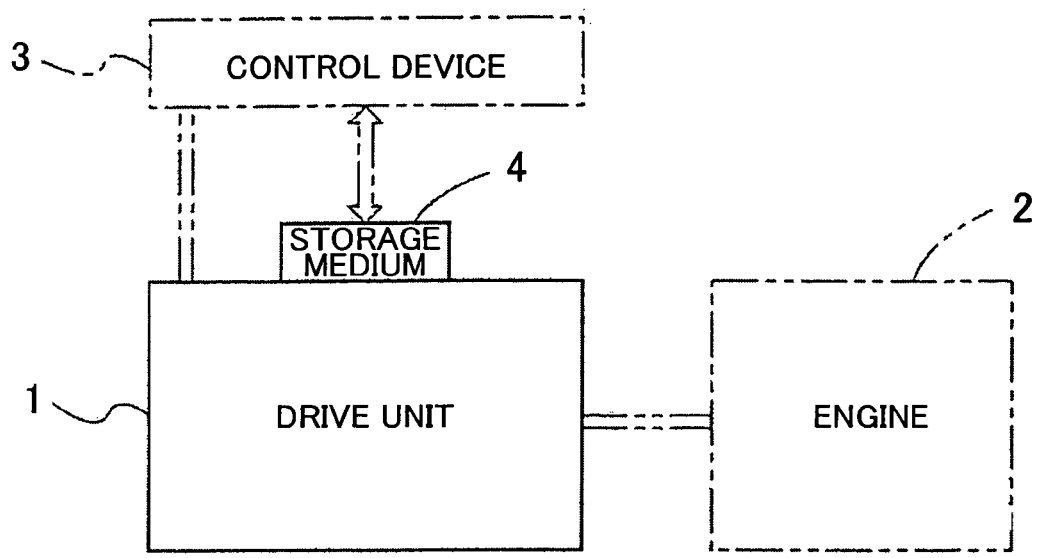
FIG. 1 is a block diagram showing a schematic structure of a drive unit having an incorporated storage medium.
Figure 2:
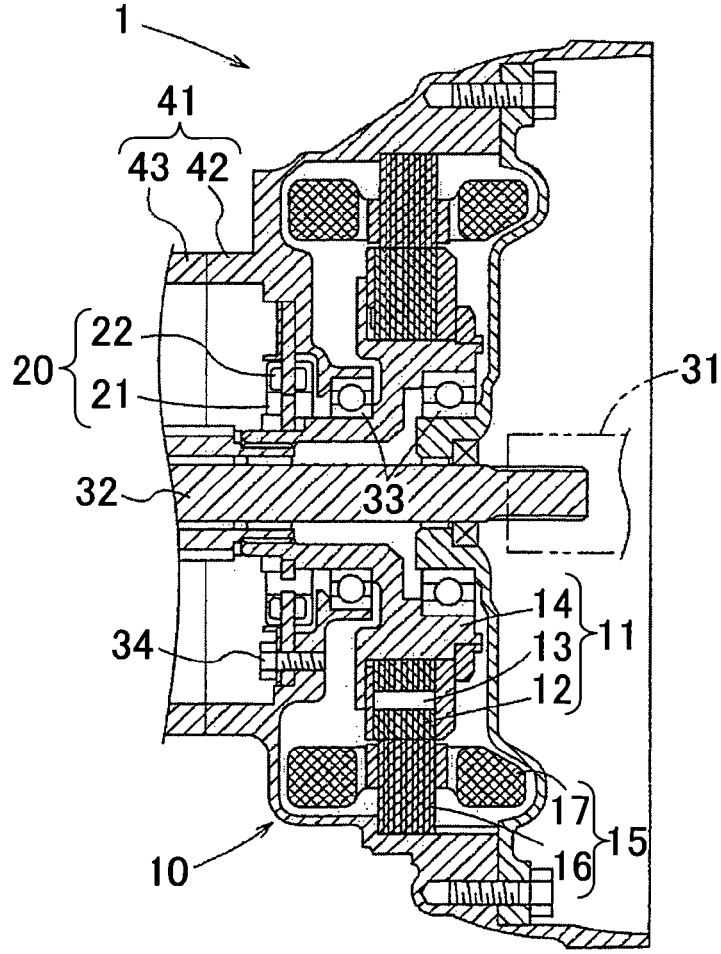
FIG. 2 is a partial cross-sectional view of the drive unit having a rotating electrical machine and a rotation sensor.
Figure 3:
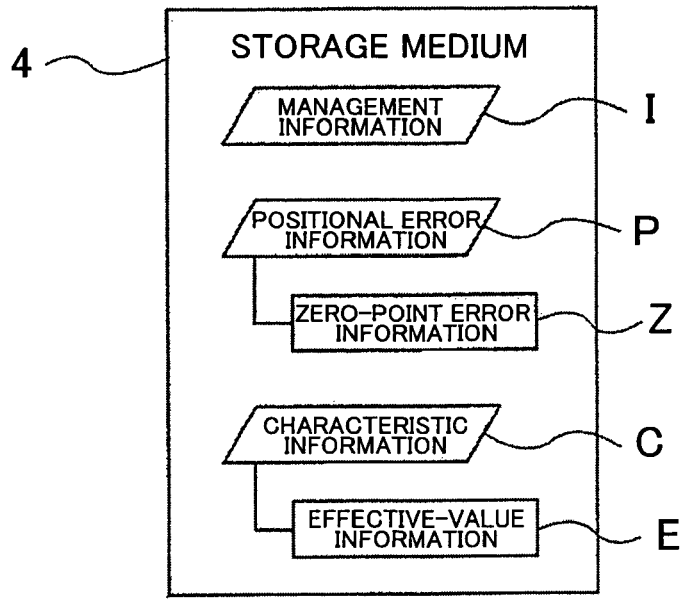
FIG. 3 is a diagram showing an example of information stored in the storage medium.
Figure 4:
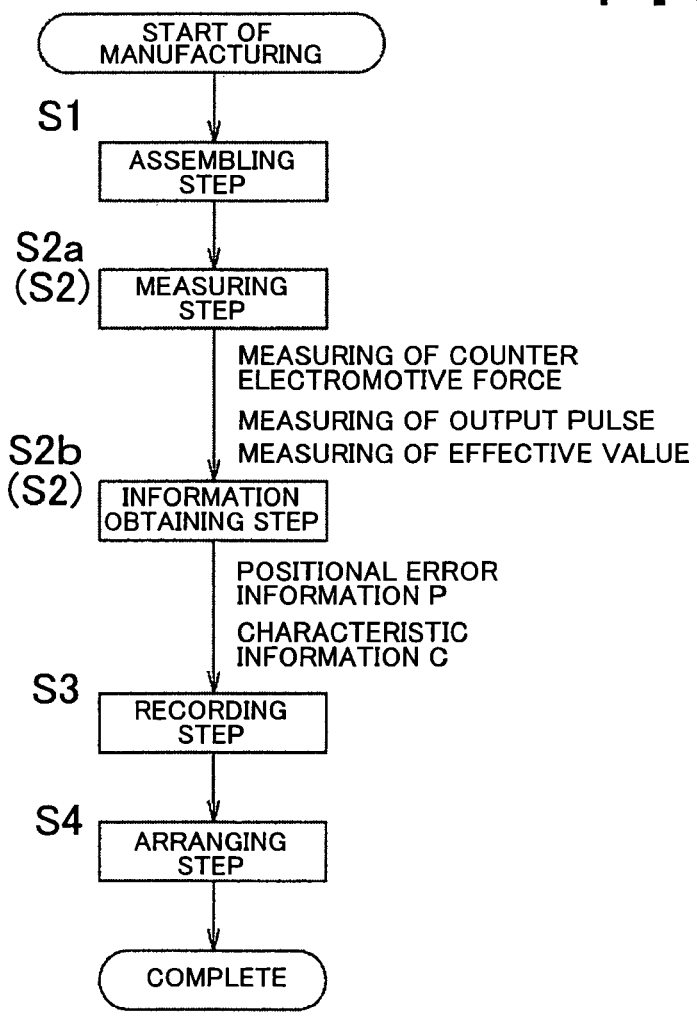
FIG. 4 is a process diagram illustrating a method for manufacturing a drive unit according to an embodiment of the present invention; and, FIG. 5A and FIG. 5B are diagrams illustrating a method for obtaining positional error information of the rotation sensor.
Figure 5A:
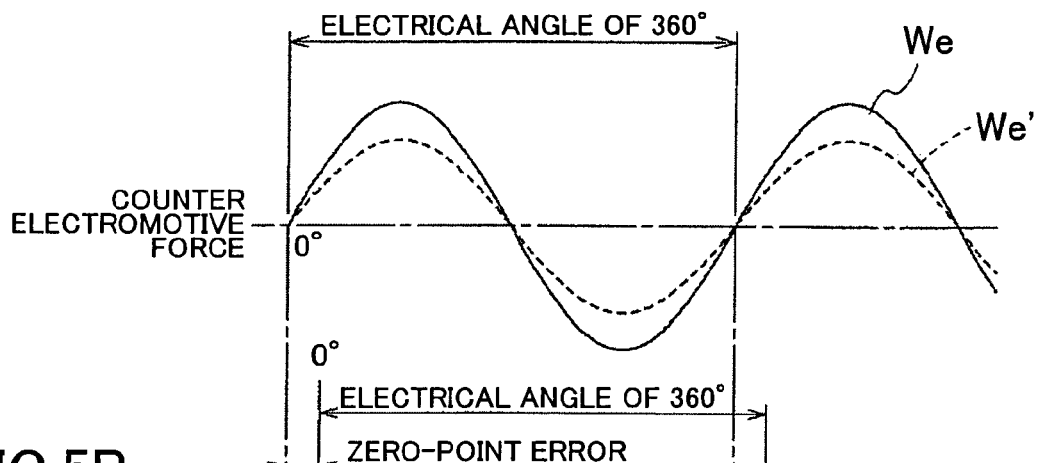
Figure 5B:
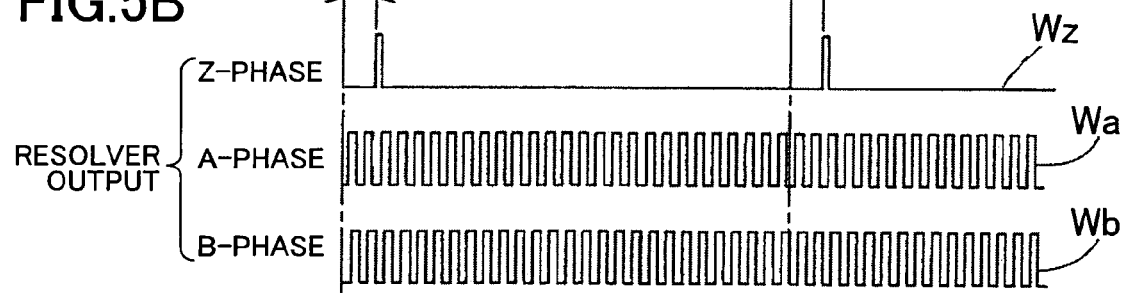

Hereinafter, an embodiment of a drive unit 1 according to the present invention will be described with reference to the accompanying drawings. In the present embodiment, description will be given, by way of example, to the case where the present invention is applied to a drive unit 1 for a hybrid vehicle that has a rotating electrical machine 10. FIG. 1 is a block diagram showing a schematic structure of the drive unit 1 having an incorporated storage medium 4. FIG. 2 is a partial cross-sectional view of the drive unit 1 having the rotating electrical machine 10 and a resolver 20 serving as a rotation sensor. FIG. 3 is a diagram showing an example of information stored in the storage medium 4. FIG. 4 shows a process diagram of a manufacturing method of the drive unit 1. FIG. 5A and FIG. 5B are diagrams illustrating a method for obtaining positional error information P of the resolver 20.

1. Structure of the Drive Unit

First, the structure of the drive unit 1 will be described. As shown in FIG. 1, the drive unit 1 of the present embodiment includes the incorporated storage medium 4. Information stored in the storage medium 4 will be described later. As shown in FIG. 2, the drive unit 1 includes an input shaft 32 integrally connected to an engine output shaft 31 such as a crankshaft for outputting rotation of an engine 2 (see FIG. 1), and the rotating electrical machine 10 and the resolver 20 which are provided around the input shaft 32. These elements are accommodated in a drive unit case 41. Note that the drive unit case 41 includes a rotating electrical machine accommodating case 42 and a body case 43. The rotating electrical machine 10 and the resolver 20 are accommodated in the rotating electrical machine accommodating case 42, and a transmission (not shown) is accommodated in the body case 43. The engine 2 and a control device 3 including an inverter are connected to the drive unit 1. Operation of the rotating electrical machine 10 is controlled by the engine 2 and the control device 3, and a rotation driving force of the rotating electrical machine 10 is transmitted to driving wheels through a speed change mechanism, a counter gear mechanism, and an operating gear mechanism which are not shown in the figures. A hybrid vehicle having the drive unit 1 can thus travel.

As shown in FIG. 2, the rotating electrical machine 10 includes a rotor 11 that is rotatably connected to the input shaft 32 integrally connected to the engine output shaft 31, and a stator 15 that is provided radially outside the rotor 11 so as to be coaxial with the rotor 11 and is fixed to the rotating electrical machine accommodating case 42. The rotor 11 includes a rotor core 12, a plurality of permanent magnets 13 respectively arranged at a plurality of positions in a circumferential direction of the rotor core 12, and a rotor support member 14 for fixing and supporting the rotor core 12 and the permanent magnets 13. The rotor 11 is provided so as to be rotatable around a rotation axis center of the input shaft 32 through a bearing 33 provided between the rotor support member 14 and the rotating electrical machine accommodating case 42. The stator 15 includes a stator core 16 and a coil 17 wound around the stator core 16. Such a rotating electrical machine 10 is a motor generator functioning as both a motor (electric motor) and a generator (electric generator) as required. More specifically, the rotating electrical machine 10 functions as a motor for generating rotation to generate a torque during, for example, starting and acceleration of a vehicle, and functions as a generator during, for example, regenerative braking for decelerating the vehicle.

The resolver 20 is provided at a position adjacent to the rotor 11 of the rotating electrical machine 10. The resolver 20 is provided in order to precisely detect the rotational position and the rotational speed of the rotor 11 with respect to the stator 15 of the rotating electrical machine 10. In the present embodiment, the resolver 20 is an example of the rotation sensor of the present invention. The resolver 20 includes a sensor rotor 21 and a sensor stator 22. The sensor rotor 21 is integrally attached to the rotor support member 14 and rotates with the rotor 11 of the rotating electrical machine 10. The sensor stator 22 is provided radially outside the sensor rotor 21 so as to be coaxial with the sensor rotor 21. The sensor stator 22 is fixed to the rotating electrical machine accommodating case 42 by a bolt 34.

An output signal from the resolver 20 is converted to a three-phase signal, that is, an A-phase signal, a B-phase signal, and a Z-phase signal, by an R/D converter (Resolver-to-Digital converter; not shown). As shown in FIG. 5B, the Z-phase signal has a Z-phase pulse waveform Wz in which a rectangular pulse signal is generated every one rotation of the sensor rotor 21 of the resolver 20. The A-phase signal and the B-phase signal have an A-phase pulse waveform Wa and a B-phase pulse waveform Wb, respectively, in which a rectangular pulse signal is generated at a very short, predetermined cycle with a predetermined phase difference from each other. In the pulse waveforms thus obtained, an electrical angle of the rotation sensor is set by using a rising point of the Z-phase pulse waveform Wz as a reference (zero point). More specifically, a rising point of one pulse signal is set as an electrical angle of 0°, and a rising point of a pulse signal following this pulse signal is set as an electrical angle of 360°. A predetermined number of pulse signals are included in the A-phase signal in one cycle of the Z-phase signal (the electrical angle of 0° to 360°). Therefore, the rotational position (electrical angle) can be obtained by counting the number of pulse signals that have appeared from a reference point (zero point) of the Z-phase signal to each point. In this example, it is assumed by way of example only that the A-phase signal corresponding to 1,024 pulses is included in one cycle of the Z-phase signal. In this example, provided that n A-phase signals have appeared from the reference point (zero point) to a certain time point, the rotational position at that time point is a position corresponding to an electrical angle of (360°/1,024)×n. Note that since there is the predetermined phase difference between the A-phase signal and the B-phase signal, the rotation direction of the rotor 11 of the rotating electrical machine 10 can be determined based on the output order of the A-phase signal and the B-phase signal.

Referring back to FIG. 1, the storage medium 4 is integrally provided in the drive unit 1. In the present embodiment, the storage medium 4 is a medium capable of optically reading stored information, more specifically, a barcode, and is attached to the surface of the rotating electrical machine accommodating case 42 that accommodates the rotating electrical machine 10 and the resolver 20. The barcode as the storage medium 4 may be a one-dimensional barcode or a two-dimensional barcode such as a QR code (registered trademark). As conceptually shown in FIG. 3, at least positional error information P is stored in the storage medium 4. In the present embodiment, management information I and characteristic information C regarding the rotating electrical machine 10 are additionally stored therein. The management information I is information including an identification code of the rotating electrical machine 10 included in the drive unit 1. The management information I is required to manage a manufacturing process of the rotating electrical machine. The positional error information P and the characteristic information C are obtained based on information of a counter electromotive force obtained by mechanically driving the rotating electrical machine 10 in an inspecting step S2 described later (see FIG. 4) which is performed after the rotating electrical machine 10 and the resolver 20 are assembled together.

As described later in detail, the positional error information P is zero point error information Z regarding a zero-point error between a voltage waveform We as the information of the counter electromotive force and a pulse signal as output information from the resolver 20. The characteristic information C includes effective-value information E regarding an effective value of the voltage waveform We as the information of the counter electromotive force.

2. Manufacturing Method of the Drive Unit

Hereinafter, an outline of a method for manufacturing the drive unit 1 according to the present embodiment will be described. As shown in FIG. 4, the drive unit 1 according to the present embodiment is manufactured through an assembling step S1, an inspecting step S2, a recording step S3, and an arranging step S4.

In the assembling step S1, the rotating electrical machine 10 and the resolver 20 are assembled together. The rotating electrical machine 10 and the resolver 20 are assembled by a known method so that the respective axis centers match each other and so that the respective positions of the zero point (the point at which the electrical angle becomes 0°) are substantially the same. In this stage, the respective zero-point positions of the rotating electrical machine 10 and the resolver 20 are substantially the same, but do not completely match each other. The rotating electrical machine 10 and the resolver 20 therefore have a predetermined assembly error in this stage. Moreover, the rotating electrical machine 10 and the resolver 20 themselves have a mechanical error due to slight non-uniformity in arrangement of the permanent magnets 13 and the coil 17. Such an assembly error and a mechanical error cause a phase difference between the rotating electrical machine 10 and the resolver 20. It is therefore necessary to adjust the phase difference in order to precisely detect the rotational position of the rotor 11 with respect to the stator 15 of the rotating electrical machine 10 and thus enable accurate speed control of the rotating electrical machine 10. In the present embodiment, the phase difference is not mechanically adjusted by, for example, rotating the rotation sensor in a circumferential direction with respect to the rotating electrical machine while sequentially verifying the phase difference, but is adjusted by using a method described below.

In the inspecting step S2, positional error information P of the resolver 20 is obtained based on information of a counter electromotive force obtained by mechanically driving the rotating electrical machine 10 and outputting information from the resolver 20. Note that measurement of the counter electromotive force is an inspection item that is usually performed after assembly of the rotating electrical machine 10 and the resolver 20 in order to confirm that the rotating electrical machine 10 and the resolver 20 operate normally. The measurement of the counter electromotive force is therefore not a special step that is added to obtain the phase difference. The inspecting step S2 has a measuring step S2a and an information obtaining step S2b.

In the measuring step S2a, the counter electromotive force is measured by mechanically driving the rotating electrical machine 10, and information of the counter electromotive force is obtained. A sinusoidal voltage waveform We as shown by solid line in FIG. 5A is obtained as the information of the counter electromotive force. In the voltage waveform We thus obtained, an electrical angle of the rotating electrical machine 10 is set by using a zero-cross point as a reference (zero point). More specifically, one zero-cross point is set as an electrical angle of 0°, and a zero-cross point after one wavelength from that zero-cross point is set as an electrical angle of 360°. In the measuring step S2a, output information from the resolver 20 is further obtained. The Z-phase pulse waveform Wz and the A-phase pulse waveform Wa as described above are obtained as the output information from the resolver 20 (see FIG. 5B).

In the information obtaining step S2b, positional error information P of the resolver 20 is obtained based on the information of the counter electromotive force and the output information from the resolver 20 obtained in the measuring step S2a. As described above, each of the voltage waveform We obtained as the information of the counter electromotive force and the Z-phase pulse waveform Wz obtained as the output information from the resolver 20 has a reference point (zero point) where the electrical angle becomes 0°. In the present embodiment, zero-point error information Z regarding an error between the respective zero points is obtained as the positional error information P. More specifically, the sinusoidal voltage waveform We from the rotating electrical machine 10 and the Z-phase pulse waveform Wz from the resolver 20 are simultaneously obtained, and information of the phase difference corresponding to the number (or the magnitude of a corresponding electrical angle) of pulse signals of the A-phase pulse waveform Wa which appear between the respective zero points is obtained as the zero-point error information Z, that is, the positional error information P.

In the present embodiment, characteristic information C of the rotating electrical machine 10 is further obtained in the information obtaining step S2b based on the voltage waveform We obtained as the information of the counter electromotive force by mechanically driving the rotating electrical machine 10. More specifically, an effective value of the voltage waveform We is measured based on the voltage waveform We obtained as the information of the counter electromotive force, and the characteristic information C is obtained as information including effective-value information E regarding the effective value of the voltage waveform We. A voltage waveform We' is shown by dashed line in FIG. 5A as the information of the counter electromotive force obtained by mechanically driving another rotating electrical machine 10. In this example, an effective value corresponding to the voltage waveform We' is smaller than that corresponding to the voltage waveform We. When these rotating electrical machines 10 are respectively assembled to the drive units 1 for operation, a larger current input is required for the rotating electrical machine 10 of the voltage waveform We' in order to obtain the same rotation driving force. By thus obtaining the effective-value information E as the characteristic information C and storing it in the storage medium 4, the individual rotating electrical machines 10, even if they have different characteristics, can be more precisely controlled during operation of the respective drive units 1 based on the effective-value information E obtained as the characteristic information C.

In the recording step S3, the positional error information P and the characteristic information C obtained in the information obtaining step S2b are stored in the storage medium 4. In the present embodiment, the positional error information P and the characteristic information C are stored in a barcode serving as the storage medium 4 by using a barcode writer. In the present embodiment, management information I including an identification code of the rotating electrical machine 10 included in the drive unit 1 is also stored in the barcode.

In the arranging step S4, the storage medium 4 storing the positional error information P, the characteristic information C, and the management information I is integrally arranged in the drive unit case 41 in such a state that the storage medium 4 is readable from outside the drive unit 1. In the present embodiment, the barcode serving as the storage medium 4 is attached to the surface of the rotating electrical machine accommodating case 42 accommodating the rotating electrical machine 10 and the resolver 20. The drive unit 1 is thus completed through the above steps.

The drive unit 1 itself is completed when the process up to the arranging step S4 is completed. At this time, however, there still is such a phase difference as described above between the rotating electrical machine 10 and the resolver 20 due to the assembly error or the like. In the present embodiment, adjustment of the phase difference is electrically carried out by the control device 3 that is assembled to the drive unit 1 after the drive unit 1 is shipped. In other words, the positional error information P stored in the barcode as the storage medium 4 integrally provided in the drive unit case 41 is read from outside the drive unit case 41 by a barcode reader and transferred to a memory included in the control device 3. The control device 3 then corrects an output signal of the resolver 20 based on the positional error information P, and uses the corrected output signal to adjust the phase difference. More specifically, the control device 3 offsets the zero-point position of the Z-phase pulse waveform Wz from the resolver 20 by the zero-point error information Z obtained in the information obtaining step S2b. As a result, electrically, the rotating electrical machine 10 and the resolver 20 become substantially in phase with each other, whereby the control device 3 can accurately control the rotation speed of the rotating electrical machine 10. According to the present invention, the control device 3 as a control device can electrically adjust the phase difference between the rotating electrical machine 10 and the resolver 20 based on the received positional error information P. Therefore, it is not necessary to mechanically adjust the attachment position of the resolver 20, enabling reduction in manufacturing time. Moreover, no adjustment mechanism for carrying out such mechanical adjustment is required, enabling reduction in manufacturing cost.

The storage medium 4 storing the positional error information P is integrally provided in the drive unit case 41 in such a state that the storage medium 4 is readable by the control device 3. Accordingly, when the drive unit 1 and the control device 3 are assembled together, a combination of the rotating electrical machine 10 and the resolver 20 having a positional error therebetween can be easily made to correspond one-to-one to the positional error information P obtained for this combination in the inspecting step S2, and the positional error information P can be transferred from the storage medium 4 to the control device 3. In particular, even when the drive units 1 and the control devices 3 are manufactured separately and transported to a different place for assembly, the error information of the drive units 1 has not been stored in the control devices 3 at the time of transportation. This is advantageous because no special management work for making each drive unit 1 correspond one-to-one to each control device 3 is required for transportation, storage, and the like of the drive units 1 and the control devices 3. Moreover, even if the drive unit 1 or the control device 3 fails after a vehicle has been shipped, the phase difference between the rotating electrical machine 1 and the resolver 20 can be adjusted by merely transferring the positional error information P from the storage medium 4 integrally provided in another drive unit 1 to the control device 3 or transferring the positional error information P from the storage medium 4 integrally provided in the drive unit 1 to another control device 3. This facilitates repair work. Other embodiments (1) In the example described in the above embodiment, a barcode capable of optically reading stored information is used as the storage medium 4. However, as long as the stored information is readable upon assembly with the control device 3, an electromagnetic storage medium that is provided so as to be readable from outside the rotating electrical machine accommodating case 42 accommodating the rotating electrical machine 10 and the resolver 20 or readable from the control device 3 integrally provided in the rotating electrical machine accommodating case 42 may be used as the storage medium 4

For example, an IC tag may be used as the electromagnetic storage medium, and positional error information P stored in the IC tag can be read upon assembling with the control device 3 by using an IC tag reader provided at a predetermined distance from the drive unit case 41. Alternatively, a semiconductor memory may be used as the electromagnetic storage medium, and positional error information P stored in the semiconductor memory can be read from the control device 3 by electrically connecting the semiconductor memory provided in the drive unit case 41 with the control device 3 upon assembling with the control device 3. Alternatively, a magnetic stripe card or the like may be used as the electromagnetic storage medium.

(2) In the example described in the above embodiment, the barcode as the storage medium 4 is integrally provided in the drive unit 1 by attaching the barcode to the surface of the rotating electrical machine accommodating case 42. However, the storage medium 4 need only be integrally provided in the drive unit 1 and may alternatively be attached to the surface of the body case 43. The storage medium 4 does not have to be integrally provided in the drive unit case 41, and may be provided in any form as long as at least the drive unit 1 is made to correspond one-to-one to the storage medium 4 storing the positional error information P obtained for a combination of the rotating electrical machine 10 and the resolver 20 included in this drive unit 1. For example, the storage medium 4 may be integrally provided in the drive unit 1 by attaching the barcode as the storage medium 4 to a package box of the drive unit 1.

(3) In the example described in the above embodiment, the present invention is applied to the hybrid vehicle drive unit 1 including the rotating electrical machine 10. However, the present invention is also applicable to other drive units 1 such as a drive unit for an electric car as long as the drive unit 1 includes a rotating electrical machine and a rotation sensor for detecting the rotational position of a rotor of the rotating electrical machine.

The present invention is used in a drive unit including a rotating electrical machine and a rotation sensor for detecting the rotational position of a rotor of the rotating electrical machine.

The "positional error information of the rotation sensor" herein means information regarding a phase difference between the rotating electrical machine and the rotation sensor due to an assembly error produced when the rotating electrical machine and the rotation sensor are assembled together, a mechanical error of the rotating electrical machine and the rotation sensor themselves, and the like.

According to an exemplary aspect of the invention, in the inspecting step performed after the rotating electrical machine and the rotation sensor are assembled together, operation of the rotating electrical machine is confirmed based on the information of the counter electromotive force obtained by mechanically driving the rotating electrical force. At the same time, the positional error information of the rotation sensor is obtained based on the information of the counter electromotive force and the output information from the rotation sensor. Therefore, the phase difference between the rotating electrical machine and the rotation sensor can be obtained without requiring a special step for obtaining the phase difference. The positional error information thus obtained is stored in the storage medium, and the storage medium is integrally provided in the drive unit in such a state that the storage medium is readable by the control device. Accordingly, after the drive unit and the control device are assembled together, a combination of the rotating electrical machine and the rotation sensor having a positional error therebetween can be easily made to correspond one-to-one to the positional error information obtained for this combination in the inspecting step, whereby the positional error information can be easily transferred from the storage medium to the control device. As a result, no special management work for making each drive unit correspond one-to-one to a control device storing error information of this drive unit is required for transportation, storage, and the like of the drive units and the control devices. Increase in cost therefore does not occur. The control device can electrically adjust the phase difference between the rotating electrical machine and the rotation sensor based on the received positional error information. Therefore, it is not necessary to mechanically adjust the attachment position of the rotation sensor, enabling reduction in manufacturing time. Moreover, no adjustment mechanism is required, enabling reduction in manufacturing cost. Thus, a drive unit capable of adjusting the phase difference between the rotating electrical machine and the rotation sensor in a simple manner at low cost can be provided.

According to an exemplary aspect of the invention, the characteristic information of the rotating electrical machine is obtained based on the information of the counter electromotive force obtained in the inspecting step, and is further stored in the storage medium. The characteristic information of the rotating electrical machine can be transferred from the storage medium to the control device when the drive unit and the control device are assembled together. The control device can therefore perform more precise control based also on the characteristics of the rotating electrical machine.

According to an exemplary aspect of the invention, the obtained positional error information is stored in the optically readable storage medium. The positional error information can therefore be easily transferred from the storage medium to the control device by using an optical reading apparatus capable of optically reading information. The storage medium is directly attached to the surface of the case accommodating the rotating electrical machine and the rotation senor. A combination of the rotating electrical machine and the rotation sensor having a positional error therebetween and positional error information obtained for this combination in the inspecting step can therefore be reliably made to correspond one-to-one to each other in the step of assembling the control device with the case accommodating the rotating electrical machine and the rotation sensor. The phase difference between the rotating electrical machine and the rotation sensor can thus be reliably and accurately adjusted.

According to an exemplary aspect of the invention, the obtained positional error information is stored in the electromagnetic storage medium. Therefore, the positional error information can be easily transferred from the storage medium to the control device by using a reading apparatus for reading an electric signal or a magnetic signal. The storage medium is provided so as to be readable from outside the case accommodating the rotating electrical machine and the rotation sensor or readable from the control device integrally provided in the case. Therefore, a combination of the rotating electrical machine and the rotation sensor having a positional error therebetween and positional error information obtained for this combination in the inspecting step can be reliably made to correspond one-to-one to each other in the step of assembling the control device with the case accommodating the rotating electrical machine and the rotation sensor. The phase difference between the rotating electrical machine and the rotation sensor can thus be reliably and accurately adjusted.

According to an exemplary aspect of the invention, the management information such as the identification code of the rotating electrical machine is further stored in the storage medium storing the positional error information. Thus, information required to manage the manufacturing process of the rotating electrical machine can be retained without increasing the number of storage mediums.

According to an exemplary aspect of the invention, the phase difference between the rotating electrical machine and the rotation sensor can be easily obtained from the zero-point error between the voltage waveform as the information of the counter electromotive force and the pulse signal as the output information from the rotation sensor.

According to an exemplary aspect of the invention, in the inspecting step, the effective value is further measured based on the voltage waveform as the information of the counter electromotive force obtained by mechanically driving the rotating electrical machine, and the information of the effective value is stored in the storage medium as a kind of the characteristic information of the rotating electrical machine.

By thus obtaining the information of the effective value as the characteristic information, individual rotating electrical machines, even if they have different characteristics, can be more precisely controlled using the information of the effective value, during operation of the respective drive units.

According to an exemplary aspect of the invention, in the inspecting step performed after the assembling step, operation of the rotating electrical machine is confirmed based on the information of the counter electromotive force obtained by mechanically driving the rotating electrical force. At the same time, in the information obtaining step, the positional error information of the rotation sensor is obtained based on the information of the counter electromotive force and the output information from the rotation sensor. The step for obtaining the phase difference can therefore be carried out by an arithmetic operation. Accordingly, the phase difference between the rotating electrical machine and the rotation sensor can be obtained without requiring a special step. The positional error information thus obtained is stored in the storage medium in the recording step, and the storage medium is integrally arranged in the drive unit in the arranging step in such a state that the storage medium is readable by the control device. Accordingly, after the drive unit and the control device are assembled together thereafter, a combination of the rotating electrical machine and the rotation sensor having a positional error therebetween can be easily made to correspond one-to-one to the positional error information obtained for this combination in the inspecting step, whereby the positional error information can be easily transferred from the storage medium to the control device. As a result, no special management work for making each drive unit correspond one-to-one to a control device storing error information of this drive unit is required for transportation, storage, and the like of the drive units and the control devices. Increase in cost therefore does not occur. The control device can electrically adjust the phase difference between the rotating electrical machine and the rotation sensor based on the received positional error information. Therefore, it is not necessary to mechanically adjust the attachment position of the rotation sensor, enabling reduction in manufacturing time. Moreover, no adjustment mechanism is required, enabling reduction in manufacturing cost. According to this structure, a drive unit capable of adjusting the phase difference between the rotating electrical machine and the rotation sensor in a simple manner at low cost can be provided.

What is claimed is:

1. A drive unit, comprising:
   a rotating electrical machine;
   a rotation sensor that detects a rotational position of a rotor of the rotating electrical machine, and
   a storage medium, wherein:
      in an inspecting step of measuring a counter electromotive force by mechanically driving the rotating electrical machine after the rotating electrical machine and the rotation sensor are assembled together, positional error information of the rotation sensor obtained based on information of the counter electromotive force and output information from the rotation sensor is stored in the storage medium, and
      the storage medium is integrally provided to the drive unit in such a state that the storage medium is readable upon assembling a control device that controls the rotating electrical machine.

2. The drive unit according to claim 1, wherein in the inspecting step, characteristic information of the rotating electrical machine is further obtained based on the information of the counter electromotive force obtained by mechanically driving the rotating electrical machine, and the characteristic information is further stored in the storage medium.

3. The drive unit according to claim 1, wherein the storage medium is a medium capable of optically reading stored information and is attached to a surface of a case accommodating the rotating electrical machine and the rotation sensor.

4. The drive unit according to claim 1, wherein the storage medium is an electromagnetic storage medium that is provided so as to be readable from outside a case accommodating the rotating electrical machine and the rotation sensor or readable from the control device integrally provided in the case.

5. The drive unit according to claim 1, wherein management information including an identification code of the rotating electrical machine is further stored in the storage medium.

6. The drive unit according to claim 1, wherein the positional error information of the rotation sensor is information of a zero-point error between a voltage waveform as the information of the counter electromotive force and a pulse signal as the output information from the rotation sensor.

7. The drive unit according to claim 2, wherein the inspecting step includes a step of measuring an effective value of a voltage waveform as the information of the counter electromotive force, and the characteristic information of the rotating electrical machine includes information of the effective value of the voltage waveform.

8. The drive unit according to claim 2, wherein the storage medium is a medium capable of optically reading stored information and is attached to a surface of a case accommodating the rotating electrical machine and the rotation sensor.

9. The drive unit according to claim 2, wherein the storage medium is an electromagnetic storage medium that is provided so as to be readable from outside a case accommodating the rotating electrical machine and the rotation sensor or readable from the control device integrally provided in the case.

10. The drive unit according to claim 2, wherein management information including an identification code of the rotating electrical machine is further stored in the storage medium.

11. The drive unit according to claim 2, wherein the positional error information of the rotation sensor is information of a zero-point error between a voltage waveform as the information of the counter electromotive force and a pulse signal as the output information from the rotation sensor.

12. The drive unit according to claim 3, wherein management information including an identification code of the rotating electrical machine is further stored in the storage medium.

13. The drive unit according to claim 3, wherein the positional error information of the rotation sensor is information of a zero-point error between a voltage waveform as the information of the counter electromotive force and a pulse signal as the output information from the rotation sensor.

14. The drive unit according to claim 4, wherein management information including an identification code of the rotating electrical machine is further stored in the storage medium.

15. The drive unit according to claim 4, wherein the positional error information of the rotation sensor is information of a zero-point error between a voltage waveform as the information of the counter electromotive force and a pulse signal as the output information from the rotation sensor.

16. The drive unit according to claim 5, wherein the positional error information of the rotation sensor is information of a zero-point error between a voltage waveform as the information of the counter electromotive force and a pulse signal as the output information from the rotation sensor.

17. The drive unit according to claim 8, wherein management information including an identification code of the rotating electrical machine is further stored in the storage medium.

18. The drive unit according to claim 8, wherein the positional error information of the rotation sensor is information of a zero-point error between a voltage waveform as the information of the counter electromotive force and a pulse signal as the output information from the rotation sensor.

19. The drive unit according to claim 9, wherein management information including an identification code of the rotating electrical machine is further stored in the storage medium.

20. The drive unit according to claim 9, wherein the positional error information of the rotation sensor is information of a zero-point error between a voltage waveform as the information of the counter electromotive force and a pulse signal as the output information from the rotation sensor.

21. The drive unit according to claim 10, wherein the positional error information of the rotation sensor is information of a zero-point error between a voltage waveform as the information of the counter electromotive force and a pulse signal as the output information from the rotation sensor.

22. The drive unit according to claim 12, wherein the positional error information of the rotation sensor is information of a zero-point error between a voltage waveform as the information of the counter electromotive force and a pulse signal as the output information from the rotation sensor.

23. The drive unit according to claim 17, wherein the positional error information of the rotation sensor is information of a zero-point error between a voltage waveform as the information of the counter electromotive force and a pulse signal as the output information from the rotation sensor.

24. The drive unit according to claim 19, wherein the positional error information of the rotation sensor is information of a zero-point error between a voltage waveform as the information of the counter electromotive force and a pulse signal as the output information from the rotation sensor.

25. A method for manufacturing a drive unit including a rotating electrical machine and a rotation sensor that detects a rotational position of a rotor of the rotating electrical machine, comprising:
   assembling the rotating electrical machine and the rotation sensor;
   measuring a counter electromotive force by mechanically driving the rotating electrical machine;
   obtaining positional error information of the rotation sensor based on information of the counter electromotive force and output information from the rotation sensor;
   storing the positional error information in a storage medium; and
   integrally arranging the storage medium to the drive unit in such a state that the storage medium is readable upon assembling a control device for controlling the rotating electrical machine.

* * * * *